US009800775B2

(12) United States Patent
Suzuki

(10) Patent No.: US 9,800,775 B2
(45) Date of Patent: Oct. 24, 2017

(54) FOCUS DETECTION APPARATUS AND METHOD, AND IMAGE CAPTURING APPARATUS

(71) Applicant: CANON KABUSHIKI KAISHA, Tokyo (JP)

(72) Inventor: Yasuyuki Suzuki, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/222,266

(22) Filed: Jul. 28, 2016

(65) Prior Publication Data
US 2017/0041526 A1 Feb. 9, 2017

(30) Foreign Application Priority Data

Aug. 4, 2015 (JP) ................... 2015-154498

(51) Int. Cl.
H04N 5/232 (2006.01)
H04N 5/369 (2011.01)
G02B 7/34 (2006.01)
G03B 13/36 (2006.01)

(52) U.S. Cl.
CPC ........... H04N 5/23212 (2013.01); G02B 7/34 (2013.01); G03B 13/36 (2013.01); H04N 5/3696 (2013.01)

(58) Field of Classification Search
CPC ............. H04N 5/23212; H04N 5/3532; H04N 5/3696; H04N 2201/0084; G02B 7/34
See application file for complete search history.

(56) References Cited

U.S. PATENT DOCUMENTS

| 6,829,008 B1* | 12/2004 | Kondo | G02B 7/34 |
| | | | 348/302 |
| 8,704,940 B2* | 4/2014 | Aoki | G02B 7/34 |
| | | | 348/241 |
| 8,982,271 B2* | 3/2015 | Aoki | G02B 7/34 |
| | | | 348/241 |
| 9,106,826 B2* | 8/2015 | Aoki | H04N 5/23212 |
| 2011/0096212 A1* | 4/2011 | Oikawa | G03B 13/36 |
| | | | 348/273 |
| 2014/0211059 A1* | 7/2014 | Aoki | G02B 7/34 |
| | | | 348/311 |

FOREIGN PATENT DOCUMENTS

| JP | 08-15604 A | 1/1996 |
| JP | 2007-052072 A | 3/2007 |

* cited by examiner

Primary Examiner — Lin Ye
Assistant Examiner — Chriss Yoder, III
(74) Attorney, Agent, or Firm — Cowan, Liebowitz & Latman, P.C.

(57) ABSTRACT

A focus detection apparatus comprising: a plurality of signal generation units that output pairs of image signals; a detection unit that detects first focus states of the imaging optical system based on the pairs of image signals without carrying out a predetermined digital filtering process, and detects second focus states of the imaging optical system based on the pairs of image signals that have undergone the predetermined digital filtering process, and reliabilities of the pairs of image signals; a selection unit that selects a second focus state to be used for focus control of the imaging optical system from among the second focus states based on the reliabilities; and an adjustment unit that, if a difference between the corresponding first and second focus states is greater than a threshold, decreases a possibility that this second focus state is selected.

12 Claims, 7 Drawing Sheets

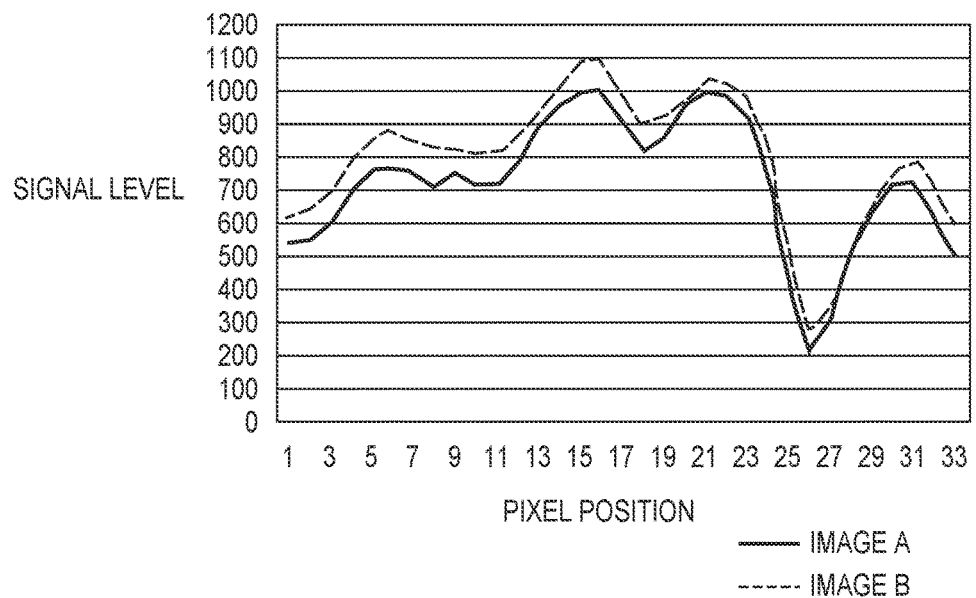
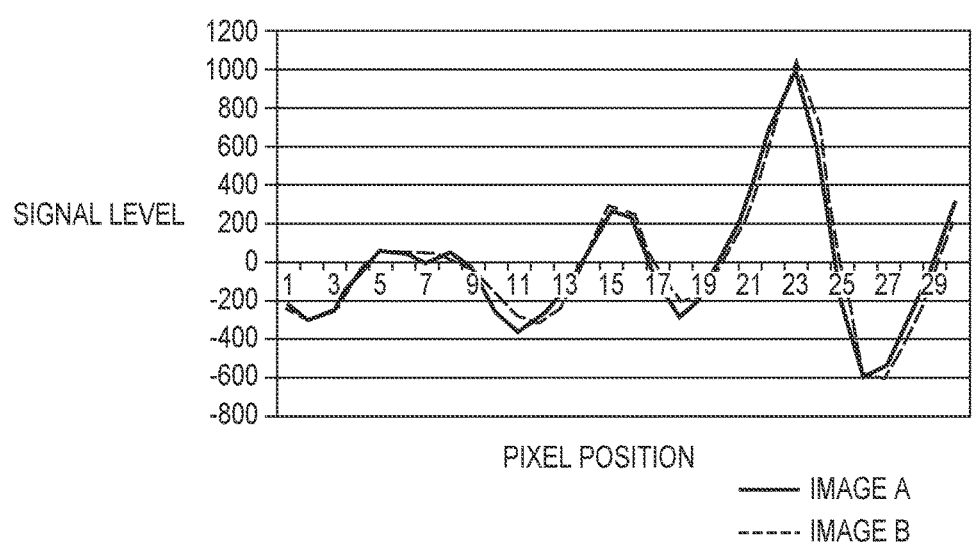

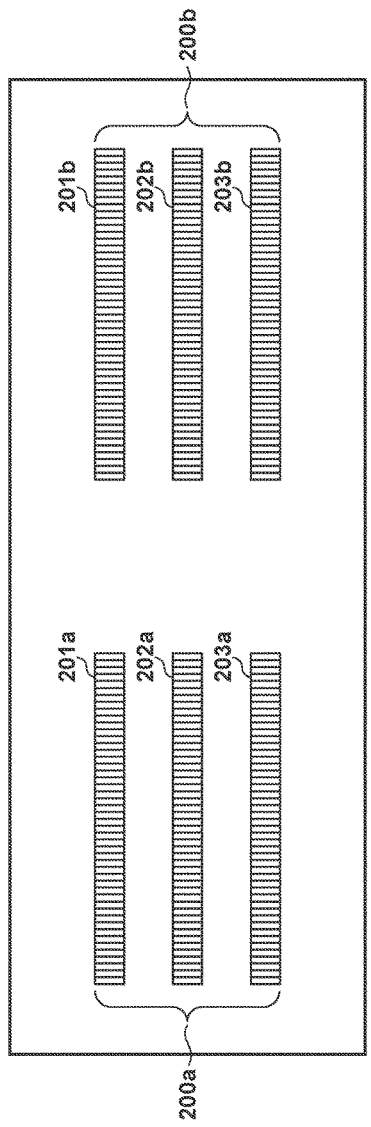
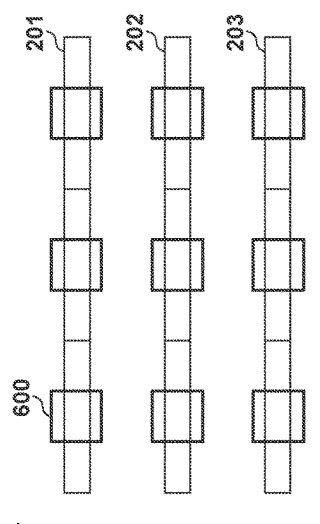

FOCUS DETECTION APPARATUS AND METHOD, AND IMAGE CAPTURING APPARATUS

BACKGROUND OF THE INVENTION

Field of the Invention

The present invention relates to a focus detection apparatus and method, and an image capturing apparatus including a focus detection apparatus.

Description of the Related Art

Conventionally, as a focus detection apparatus used in an optical device, such as a single-lens reflex camera, there is a focus detection apparatus that adapts the phase difference detection method. In this method, a pair of sensors perform photoelectric conversion on a pair of images of a subject formed by light that has transmitted through different pupil regions of an imaging lens, a phase difference between image signals output from the pair of sensors is obtained, and a defocus amount of the imaging lens is detected from the phase difference. In the phase difference detection method, it is known that if a degree of coincidence between the pair of subject images is low or if the contrast of the subject images is low, the result of the correlation operation deviates from an actual value. Accordingly, it is considered that reliability is high if a degree of coincidence between the pair of subject images is high, or if the contrast of the subject images is high. Therefore, it is also known that high precision focus detection can be performed by using a defocus amount of image signals with high reliability.

Japanese Patent Laid-Open No. 2007-52072 discloses a technique for performing high precision focus detection by selecting a specific focus detection region based on the degree of coincidence and the number of edges of a pair of subject images, and at least one of sharpness and a contrast ratio of the subject images.

Further, Japanese Patent Laid-Open No. 8-15604 disclose to divide a pair of line sensors into a plurality of blocks, and perform focus control based on a calculation result of image signals output from a block or blocks whose reliability values that evaluate the degree of coincidence of a pair of images satisfy a predetermined condition. In this manner, it is possible to realize focus detection with high accuracy while eliminating an effect of near/far conflict.

However, even if the techniques disclosed in Japanese Patent Laid-Open Nos. 2007-52072 and 8-15604 are used, there are still cases where the result of correlation operation deviates from an actual value, and consequently a defocused image is obtained due to the detection error. The causes of the detection error include inverse light transport and ghost for example, and the detection error occurs when a light which is not expected is incident on line sensors and the subject images are deformed. The degree of coincidence between the signals of deformed images is low, and the result of correlation operation tends to be unreliable.

As the degree of coincidence between two images is used to determine the reliability of the images in the conventional techniques, it is common to apply a digital filtering process of eliminating DC components of the two images in order to increase the degree of coincidence between the two images and eliminate a low frequency component in order to enhance the edge portions. However, the deformation of the image signals caused by the inverse light transport and ghost is rounded off by the digital filtering process. As a result, the calculated reliability of the subject images may be improved in spite that the degree of coincidence between two subject images actually deteriorates due to an effect of inverse light transport and ghost and the focus detection result is uncertain.

Subsequently, focus control is performed despite that the result of the correlation operation of the image signals is actually unreliable, and a defocused image is obtained as a result.

SUMMARY OF THE INVENTION

The present invention has been made in consideration of the above situation, and reduces detection error that can occur in focus detection processing by performing digital filtering process.

According to the present invention, provided is a focus detection apparatus comprising: a plurality of signal generation units that receive light transmitted through different exit pupil regions of an imaging optical system and output pairs of image signals, respectively; a detection unit that detects first focus states of the imaging optical system by phase difference detection method based on the pairs of image signals output from the plurality of the signal generation units without carrying out a predetermined digital filtering process, and detects second focus states of the imaging optical system by the phase difference detection method based on the pairs of image signals that have undergone the predetermined digital filtering process, and reliabilities of the pairs of image signals; a selection unit that selects a second focus state to be used for focus control of the imaging optical system from among the second focus states detected by the detection unit based on the reliabilities; and an adjustment unit that, if a difference between the first focus state and the second focus state corresponding to the first focus state is greater than a threshold, performs a process of decreasing a possibility that the corresponding second focus state is selected by the selection unit.

Further, according to the present invention, provided is an image capturing apparatus comprising: a focus detection apparatus that comprises a plurality of signal generation units that receive light transmitted through different exit pupil regions of an imaging optical system and output pairs of image signals, respectively; a detection unit that detects first focus states of the imaging optical system by phase difference detection method based on the pairs of image signals output from the plurality of the signal generation units without carrying out a predetermined digital filtering process, and detects second focus states of the imaging optical system by the phase difference detection method based on the pairs of image signals that have undergone the predetermined digital filtering process, and reliabilities of the pairs of image signals; a selection unit that selects a second focus state to be used for focus control of the imaging optical system from among the second focus states detected by the detection unit based on the reliabilities; and an adjustment unit that, if a difference between the first focus state and the second focus state corresponding to the first focus state is greater than a threshold, performs a process of decreasing a possibility that the corresponding second focus state is selected by the selection unit; and an image sensor that receives light transmitted through the imaging optical system and outputs an image signal.

Furthermore, according to the present invention, provided is a focus detection method comprising: detecting first focus states of an imaging optical system by phase difference detection method based on pairs of image signals output from a plurality of the signal generation units that receive light transmitted through different exit pupil regions of the imaging optical system and output the pairs of image signals, respectively, without carrying out a predetermined digital filtering process, detecting second focus states of the imaging optical system by the phase difference detection method based on the pairs of image signals that have undergone the predetermined digital filtering process, and reliabilities of the pairs of image signals; selecting a second focus state to be used for focus control of the imaging optical system from among the detected second focus states based on the reliabilities; and performing, if a difference between the first focus state and the second focus state corresponding to the first focus state is greater than a threshold, a process of decreasing a possibility that the corresponding second focus state is selected as the second focus state to be used for the focus control.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 5A and 5B are diagrams showing examples of image signals that undergo digital filtering process and do not undergo the digital filtering process according to the first embodiment;

FIGS. 6A and 6B are diagrams illustrating another position relationship between the focus detection areas and line sensors according to the embodiment.

DESCRIPTION OF THE EMBODIMENTS

Exemplary embodiments of the present invention will be described in detail in accordance with the accompanying drawings.

First Embodiment

Figure 1:
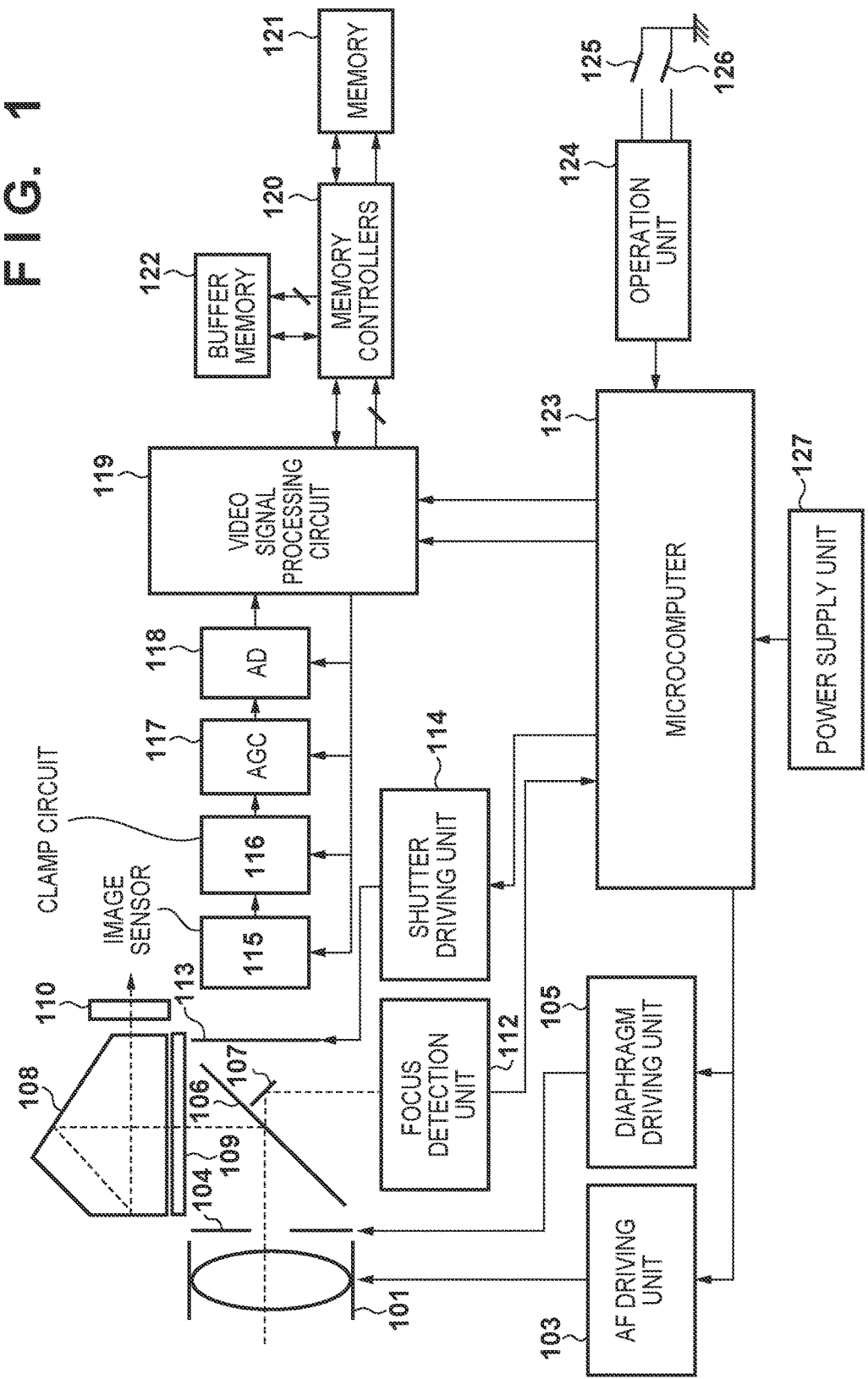
FIG. 1 is a block diagram illustrating a configuration of a single-lens reflex camera according to an embodiment of the present invention.

FIG. 1 is a block diagram illustrating a configuration of a single-lens reflex camera as an example of an image capturing apparatus according to an embodiment of the present invention.

A light flux from a subject passes through an imaging lens 101 and a diaphragm 104, and enters a main mirror 106 as an optical member. It should be noted that the imaging lens 101 is shown by a single lens in FIG. 1 for purposes of simplicity, but is actually formed from a plurality of lenses. The main mirror 106 reflects the entered light flux toward a focusing screen 109 when it is at a mirror-down position at which the main mirror 106 is inserted into a light path to an image sensor 115. When an image shooting is to be performed, the main mirror 106 flips up (mirror-up) together with a sub-mirror 107 which is another optical member, to withdraw from the light path so as to introduce the light flux to the image sensor 115.

When the main mirror 106 is at the mirror-down position, the light flux is reflected upward by the main mirror 106 and forms an optical image of the subject on the focusing screen 109. A photographer can observe this image via a pentaprism 108 and an eyepiece 110.

The central portion of the main mirror 106 is made of a half mirror, and transmits part of the light flux when the main mirror 106 is at the mirror-down position. The light flux that has transmitted through the main mirror 106 is bent downward to a focus detection unit 112 by the sub-mirror 107 arranged behind the main mirror 106. A defocus amount that shows a focus state of the imaging lens 101 on the subject is obtained by calculating, by a microcomputer 123, the output from a plurality of pairs of line sensors that perform photoelectric conversion, which will be described later, arranged within the focus detection unit. 112. The microcomputer 123 evaluates the calculation result and controls an autofocus (AF) driving unit 103. The AF driving unit 103 comprises a DC motor or an ultrasonic wave motor for example, and adjusts focus by changing the position of a focus lens included in the imaging lens 101 under control of the microcomputer 123.

Further, a diaphragm driving unit 105 drives the diaphragm 104 by a driving amount which is calculated by the microcomputer 123 on the basis of the photometry result obtained from a photometry unit (not shown), thereby changing an optical f-number. A shutter driving unit 114 drives a focal plane shutter 113. The open time of the shutter is controlled by the microcomputer 123 on the basis of the photometry result obtained from the photometry unit (not shown).

A CCD sensor or a CMOS sensor may be used as the image sensor 115, and the image sensor 115 photoelectrically converts an optical image of the subject, formed by the imaging lens 101, into an electrical signal while the main mirror 106 and the sub-mirror 107 are at the mirror-up position and the shutter 113 is open. The electrical signal output from the image sensor 115 undergoes basic analog signal processes in a clamp circuit 116 and an AGC circuit 117 prior to A/D conversion. A clamp level and an AGO reference level are changed by the microcomputer 123.

The output from the AGC circuit 117 is input to an A/D converter 118 where an analog signal is converted to a digital signal, and then the converted digital signal is output to a video signal processing circuit 119. The video signal processing circuit 119 is realized by a logic device, such as a gate array, and applies filter processing, color conversion processing, and gamma processing to the digital image data, as well as applies compression processing conforming to the JPEG standard for example, to the image data and outputs the compressed image data to a memory controller 120. The video signal processing circuit 119 is also capable of outputting information, such as exposure information and white balance information, to the microcomputer 123 as needed. The microcomputer 123 makes instructions for white balance adjustment and gain control based on the information. In a case of performing continuous shooting, image data is temporarily stored in a buffer memory 122 without being processed. After the continuous shooting is finished, the stored image data is read out via the memory controller 120, and applied with image processes and a compression process by the video signal processing circuit 119. The maximum number of images that can be captured in one continuous shooting operation depends on the capacity of the buffer memory 122.

The memory controller 120 stores in the buffer memory 122 the unprocessed digital image data input from the video signal processing circuit 119 as described above, and stores the processed digital image data in a memory 121. Inversely, the memory controller 120 reads image data from the buffer memory 122 or the memory 121 and outputs it to the video signal processing circuit 119. Note that the memory 121 may be configured as detachable.

An operation unit 124 transmits an operation by a photographer to the microcomputer 123, in turn, the microcomputer 123 controls each unit in accordance with the change of the operation unit 124. The operation unit 124 can switch between an optional selection mode and an auto selection mode. In the optional selection mode, autofocus processing is performed based on a focus state of a focus detection area manually selected by the photographer, and in the auto selection mode, the camera automatically selects a focus detection area to be used in the autofocus processing from an area wider than an area in the optional selection mode, or from all of the focus detection areas. In this embodiment, at least one focus detection area is set, and autofocus processing is performed based on a focus state of the selected focus detection area or areas.

A switch SW1 (125) and a switch SW2 (126) turn on/off in response to an operation to a release button (not shown), and constitute part of input switches to the operation unit 124. A half-stroke of the release button turns on only the switch SW1 (125), and in response to this, autofocus operation and photometry operation are performed.

Further, a full-stroke of the release button turns on both of the switches SW1 (125) and SW2 (126), and in response to this, image shooting is performed. In a case where the continuous shooting mode is set, the continuous shooting is performed while both of the switches SW1 (125) and SW2 (126) are on. Besides the switches SW1 (125) and SW2 (126), not-shown switches, such as an ISO setting button, an image size setting button, an image quality setting button, an information display button, and so forth, are connected to the operation unit. 124, and the operation unit 124 detects the states of these switches. A power supply unit 127 provides necessary power to each. IC and driving system.

Next, referring to FIGS. 2A to 2C, the relationship between line sensors provided in the focus detection units 112 and the focus detection areas on an imaging screen will be explained.

Figure 2A:
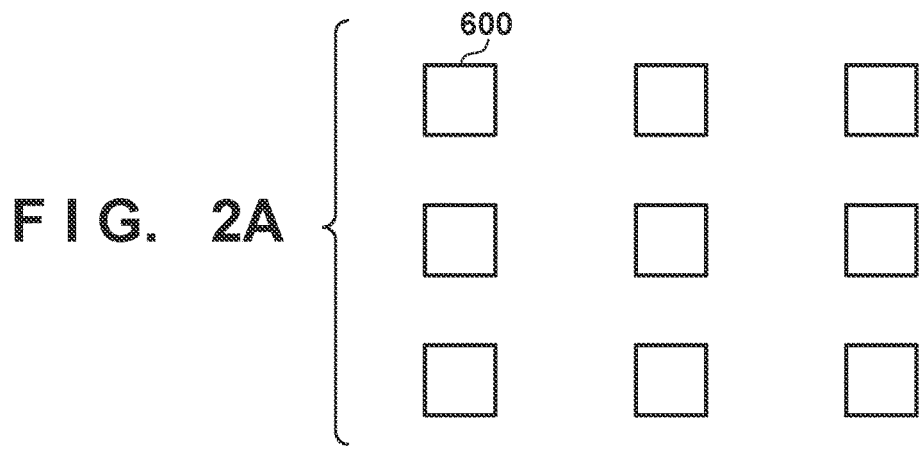
FIGS. 2A to 2C are diagrams illustrating arrangements of focus detection areas, and position relationship between the focus detection areas and line sensors according to the embodiment.

FIG. 2A is a diagram illustrating an example of an arrangement of focus detection areas 600 on an imaging screen, and nine focus detection areas 600, arranged in three lines and three columns are shown. In an example shown in FIG. 2B, it is assumed that a pair of vertical line sensors and a pair of horizontal line sensors are arranged for each focus detection area 600. FIG. 2B is a diagram illustrating the pairs of line sensors projected on the imaging screen, and a detection range 601 of the pair of vertical line sensors, and a detection range 602 of the pair of horizontal line sensors are shown. Note that plural pars of line sensors that are arranged in the same direction and shifted by a half pixel from each other may be provided for each focus detection area 600. FIG. 2C is a diagram illustrating such pairs of line sensors projected on the imaging screen, and shows detection ranges 603 and 604 of the respective pairs of line sensors. Note that it is not necessary to provide plural pairs of line sensors for every focus detection area, and some focus detection areas may be provided with a pair of line sensors.

Figure 3:
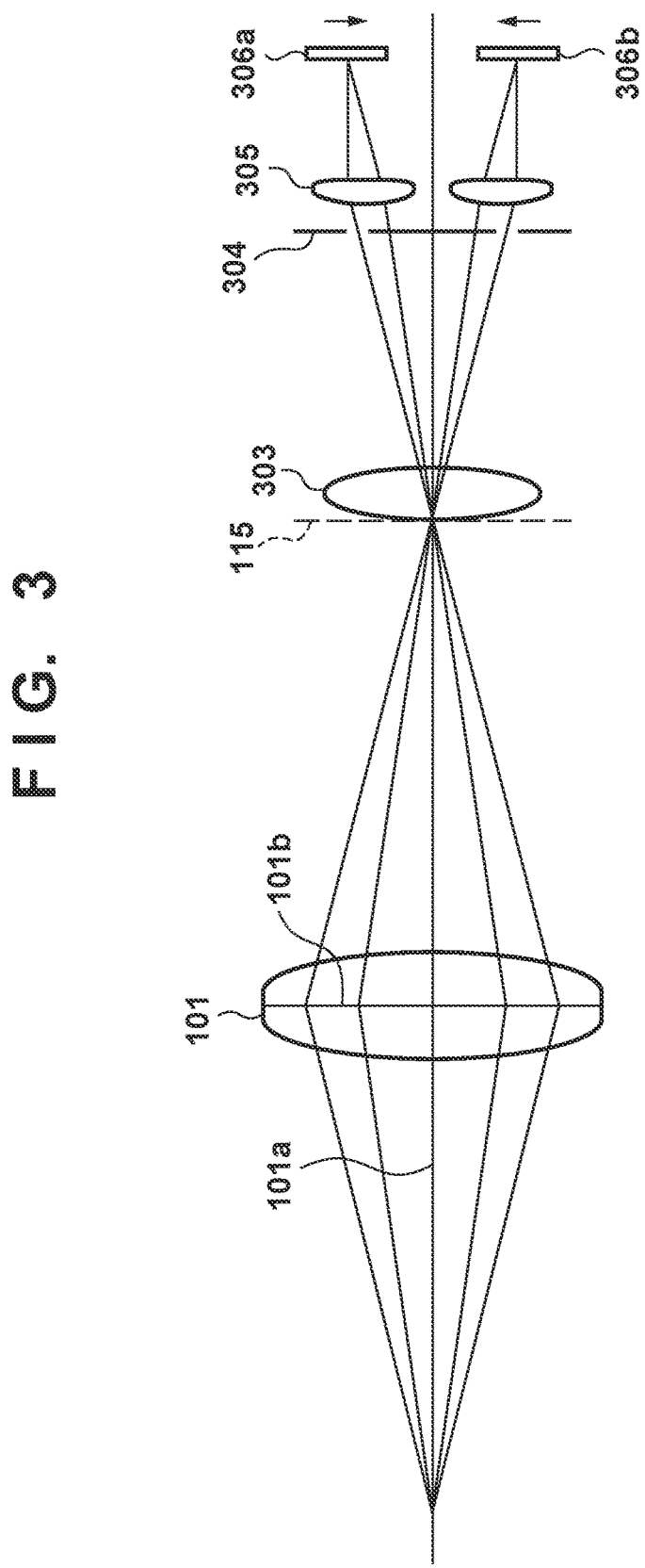
FIG. 3 is a diagram illustrating an optical arrangement of members related to focus detection according to the embodiment.

Next, an optical arrangement of members used in focus detection is shown in FIG. 3. Note that the same constituent elements as those shown in FIG. 1 are referred to by the same reference numerals. Further, in FIG. 3, the main mirror 106 and the sub-mirror 107 are not shown, and the rest of the constituent elements are shown as being developed along an optical axis 101*a* of the imaging lens 101.

The focus detection unit 112 is comprised of a field lens 303, a diaphragm 304 having a pair of apertures, a pair of secondary imaging lenses 305, a pair of line sensors 306*a* and 306*b*. Here, the line sensors 306*a* and 306*b* correspond to any of the plural pairs of line sensors described above.

A light flux emitted from a point on the optical axis 101*a* transmits through the imaging lens 101, and part of the light flux that has transmitted through the main mirror 106 is reflected by the sub-mirror 107, and converges near the field lens 303 that is arranged on a conjugate plane of an imaging plane of the image sensor 115. Thereafter, the light flux converges again on the pair of line sensors 306*a* and 306*b* at a distance from each other via the field lens 303, the diaphragm 304 and the secondary imaging lenses 305. The line sensors 306*a* and 306*b* photoelectrically convert the formed images of the subject, and output electrical signals representing the pair of images.

The field lens 303 is arranged so as to form images near a pupil 101*b* of the imaging lens 101 and the entrance pupils of the pair of secondary imaging lenses 305, namely near the diaphragm 304, and the pupil 101*b* of the imaging lens 101 is split in the vertical direction in FIG. 3 so as to correspond to the pair of apertures of the diaphragm 304.

With the above configuration, when the imaging lens 101 is extruded to the left in FIG. 3 and the light flux converges at a position shifted to the left from the image sensor 115, the pair of images formed on the pair of line sensors 306*a* and 306*b* shift in the direction of arrows. By contrast, when the imaging lens 101 is intruded to the right in FIG. 3, the pair of images formed on the pair of line sensors 306*a* and 306*b* shift in the opposite direction of the arrows. By detecting the relative shift amount of the pair of images by the line sensors 306*a* and 306*b*, it is possible to detect the focus state of the imaging lens 101 and perform focus adjustment operation of the imaging lens 101.

Thus, the focus state of the imaging lens 101 is detected by using the focus detection unit 112 having the configuration as described above, and the imaging lens 101 is controlled to follow the subject at high precision.

Figure 4:
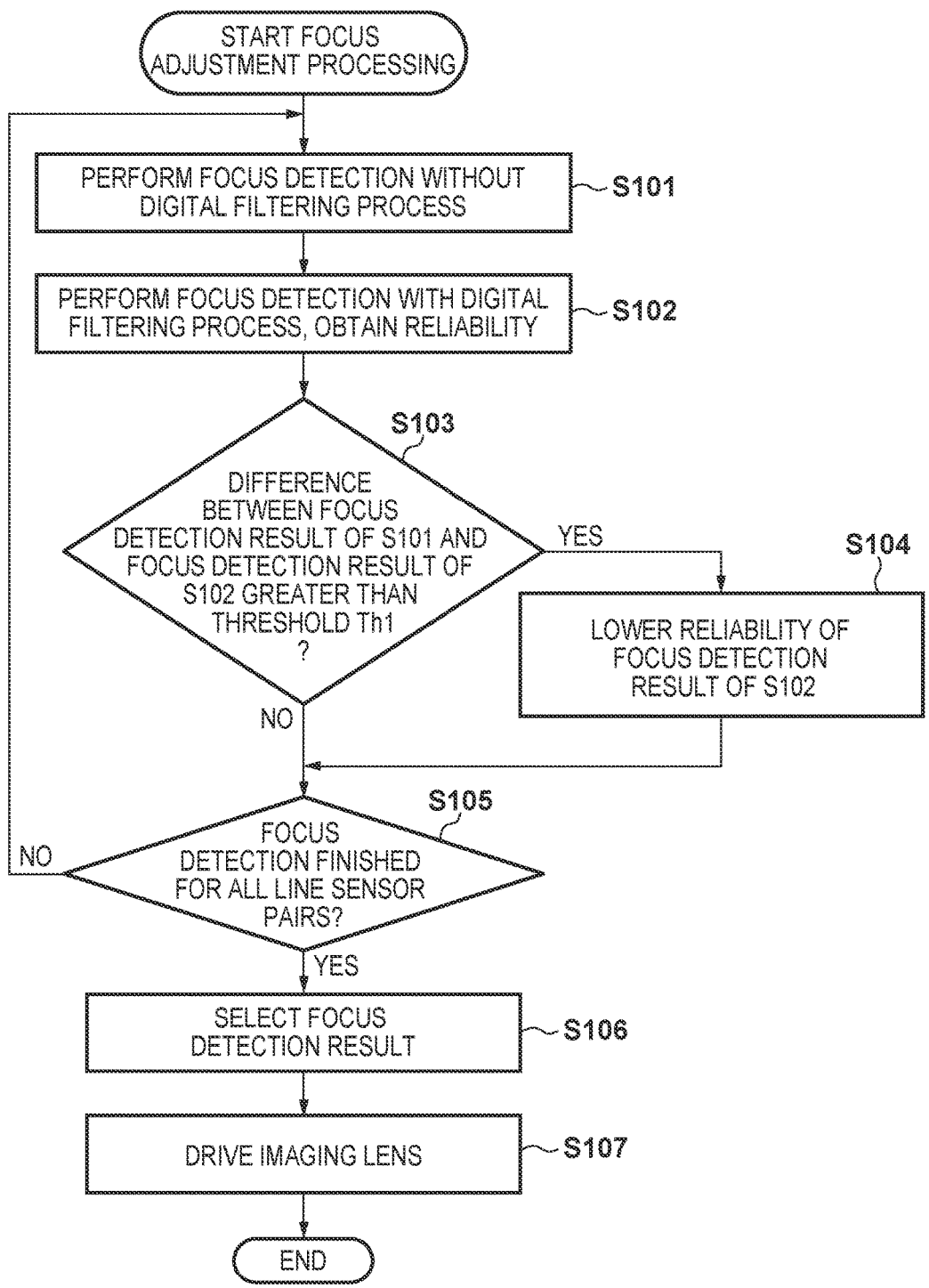
FIG. 4 is a flowchart of focus adjustment processing according to a first embodiment.

Next, focus adjustment processing of the image capturing apparatus having the above configuration according to the first embodiment will be explained with reference to FIG. 4, and FIGS. 5A and 5B. FIG. 4 is a flowchart showing the focus adjustment processing according to the first embodiment.

First, in step S101, the microcomputer 123 obtains the relative shift amount of the pair of image signals (signal pair) obtained from the focus detection unit 112 that represents a focus state of the imaging lens 101 without carrying out digital filtering process. Then in step S102, the microcomputer 123 obtains the relative shift amount of the same pair of image signals used in step S101 and a reliability of image signals with carrying out the digital filtering process. Here, the relative shift amount corresponds to a shift amount at which the highest correlation is attained among correlations calculated while shifting the pair of inane signals to each other. The reliability of the image signals is calculated on the basis of a degree of coincidence between the two images and contrast and sharpness of the image signals. The digital filter is a kind of filter that removes a DC component (low frequency component) of a signal, and the microcomputer 123 performs the digital filtering process. A sum of signals from pixels adjoining to each other in the line sensor is dealt with as one image signal, and a difference signal of the image signals are used in focus detection. The digital filtering process increases a degree of coincidence of two images by removing the DC component of the two images, enhances edge portions of the output images by removing the low frequency component, and facilitates focus detection. The order of steps S101 and S102 may be changed.

In step S103, it is determined whether or not a difference between the shift amount obtained in step S101 and the shift amount obtained in step S102 is greater than a threshold. Th1. If the difference is greater than the threshold Th1, the process proceeds to step S104. In step S104, the reliability of the focus detection result that is the shift amount obtained with carrying out the digital filtering process in step S102 is lowered. As a method of lowering the reliability, an evaluation value of the reliability calculated in step S102 may be decreased, for example. Alternatively, a flag indicating that the reliability is low may be introduced, and such flag is set to the focus detection result whose difference between the shift amounts is greater than the threshold Th1.

Following is the reason for lowering the reliability of the focus detection result obtained with carrying out the digital filtering process in a case where the difference is greater than the threshold Th1. When a DC component and/or a low frequency component of two images is removed by performing the digital filtering process, the resultant images facilitate the focus detection. However, if the subject images are deformed due to inverse light transport from a finder and ghost, such deformation is rounded off.

FIG. 5A shows an example of a pair of image signals (image A and image B) which do not undergo the digital filtering process and FIG. 5B shows an example of a pair of image signals (image A and image B) which undergo the digital filtering process, in a case where inverse light transport and ghost affect the image signals. Normally, if the images are affected by the inverse light transport and ghost, the degree of coincidence between the two images of the subject is not good as shown in FIG. 5A, and the focus detection result is unreliable. However, by performing the digital filtering process, the degree of coincidence between the two images increases as shown in FIG. 5B, and the reliability becomes well. In such case, a large gap occurs between the focus detection result with carrying out the digital filtering process and the focus detection result without carrying out the digital filtering process.

Accordingly, in the first embodiment, in a case where the difference between the shift amount obtained in step S101 and the shift amount obtained in step S102 is greater than the threshold. Th1, the reliability of the focus detection result obtained in step S102 is lowered so as to reduce a possibility that the focus detection result is selected in step S106 that will be explained later.

After lowering the reliability of the focus detection result obtained in step S102 with carrying out the digital filtering process in step S104, the process proceeds to step S105.

On the other hand, if it is determined in step S103 that the difference between the shift amount obtained in step S101 and the shift amount obtained in step S102 is equal to or less than the threshold Th1, then the process proceeds to step S105.

In step S105, it is determined whether or not the focus detection is performed for all the pairs of lane sensors. Here, if the optional selection mode is set by the operation unit 124, the determination is made for the pairs of line sensors corresponding to the selected focus detection area 600. By contrast, if the auto selection mode is set, the determination is made for the pairs of line sensors corresponding to a wider locus detection area than the focus detection area selected in the optional selection mode or all of the focus detection areas 600. If there is any pair of line sensors for which the focus detection is not carried out, the process proceeds to step S101 and the above processes are repeated based on a pair of image signals obtained from the pair of image sensors.

If the focus detection has been performed for all of the pairs of the line sensors, then the process proceeds to step S106. In step S106, the microcomputer 123 selects, using reliabilities, a focus detection result from a plurality of focus detection results obtained in step S102 with carrying out the digital filtering process. For example, in the optional selection mode, from among the focus detection results for the plural pairs of line sensors corresponding to the focus detection area 600 selected by a photographer, the focus detection result or results having the high reliability are selected. Note that upon selecting the focus detection result/results, one of the focus detection results may be selected, or, if there are a plurality of focus detection results having reliabilities higher than a predetermined reference, such focus detection results may be combined. Further, in the auto selection mode, focus detection result or results may be selected from the focus detection results whose reliabilities are not lowered since the difference between the focus detection result obtained in step S101 and the focus detection result obtained in step S102 is not greater than the threshold Th1.

Further, a focus detection result whose reliability is higher than a predetermined reference and that indicates a point closest to the camera may be selected. It should be noted that, in the auto selection mode, even if the reliability of a focus detection result is high, it is preferable to exclude such a focus detection result that is obviously of a background image or apart from other focus detection results. Further, in a case where no focus detection result whose reliability is higher than the predetermined reference exits, the focus detection result whose reliability is lowered in step S104 may be used. Or it may be controlled so that a focus detection result whose reliability is lowered in step S104 is not selected.

Further, a focus detection result to which the flag that indicates a low reliability as described above is not set may be given priority over a focus detection result to which the flag is set. Or it may be controlled so that a focus detection result to which the flag is set is not selected. In this case, if the flag is set to all the focus detection results, the focus detection result that indicates the point closest to the camera may be selected. The present invention can be applied to an image capturing apparatus having the auto selection mode or the optional selection mode.

In addition, the focus detection area corresponding to the focus detection result selected in step S106 may be displayed on a finder.

In step S107, the microcomputer 123 drives the imaging lens 101 based on the focus detection result selected in step S106 to focus on the subject.

According to the first embodiment as described above, a focus detection result whose precision is lowered despite undergoing the digital filtering process is found out, and focus adjustment using such focus detection result is prevented. Accordingly, it is possible to perform focus adjustment with higher precision.

Figure 2B:
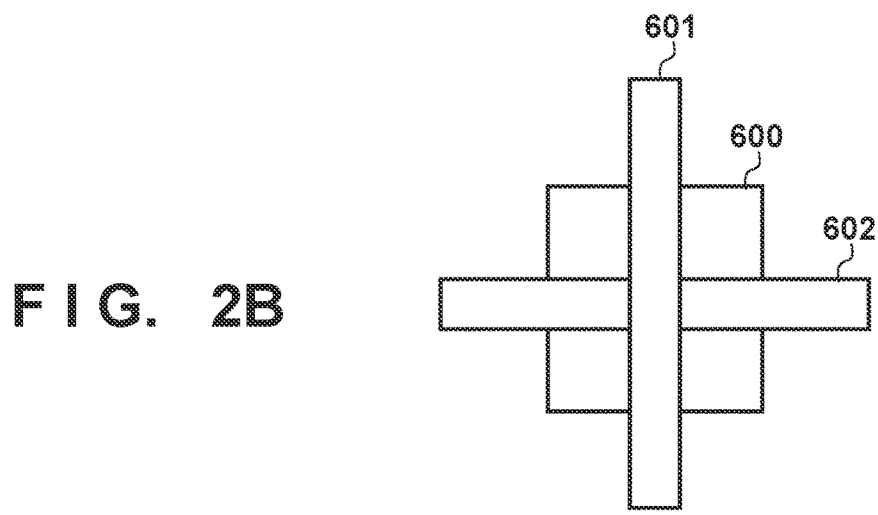
Figure 2C:
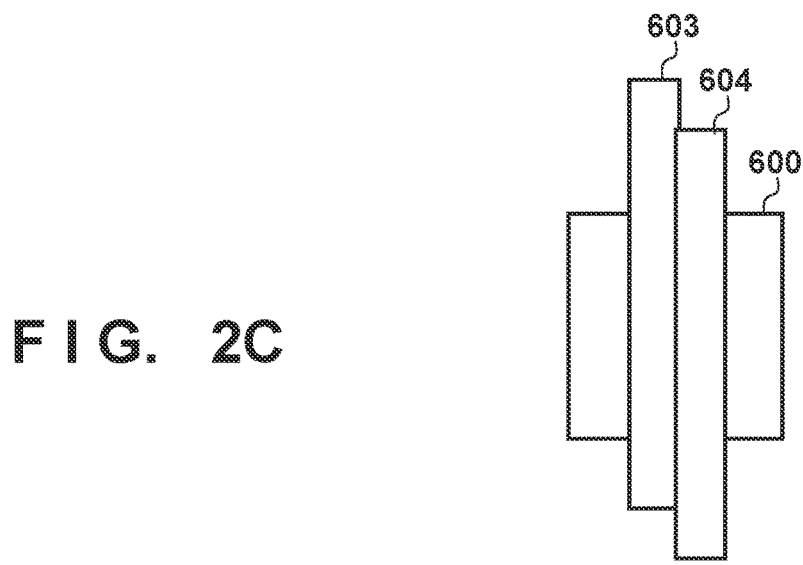

Note that a case where plural pairs of line sensors are provided for each focus detection area 600 is explained in FIGS. 2A to 2C, however, the present invention is not limited to this.

FIGS. 6A and 6B are diagrams that show an example of an arrangement of line sensors of the focus detection unit 112 and relationship between the focus detection area 600 and block division of the line sensors. Shown in FIG. 6A is an example of a line sensor group 200a having three lines of line sensors 201a, 202a and 203a, each of which has a plurality of aligned photoelectric conversion elements, arranged in the direction perpendicular to the direction of the photoelectric conversion elements. Similarly to the line sensor group 200a, a plurality of line sensors 201b, 202b and 203b are arranged as a line sensor group 200b. The line sensors 201a and 201b, the line sensors 202a and 202b, and the line sensors 203a and 203b respectively form pairs. The line sensor groups 200a and 200b respectively receive light fluxes, that are transmitted through different exit pupil regions of the imaging lens 101, from a subject.

FIG. 6B is a diagram illustrating the line sensor groups 200a and 200b projected on the imaging screen. The detection ranges 201 to 203 corresponds to the pairs of line sensors 201a to 203a and line sensors 201b to 203b, respectively. Each of the line sensor groups 200a and 200b are divided into three regions so as to correspond to each of the focus detection areas 600, and accumulation in the divided regions are independently controlled so that an appropriate exposure amount is achieved for each pair of the divided regions.

Second Embodiment

Next, focus detection processing according to a second embodiment of the present invention will be explained with reference to FIG. 7. Note that the second embodiment is similar to the first embodiment except for the method of controlling the reliability, and explanations of the configuration of the single-lens reflex camera and the brief configuration of the focus detection unit 112 are omitted.

Figure 7:
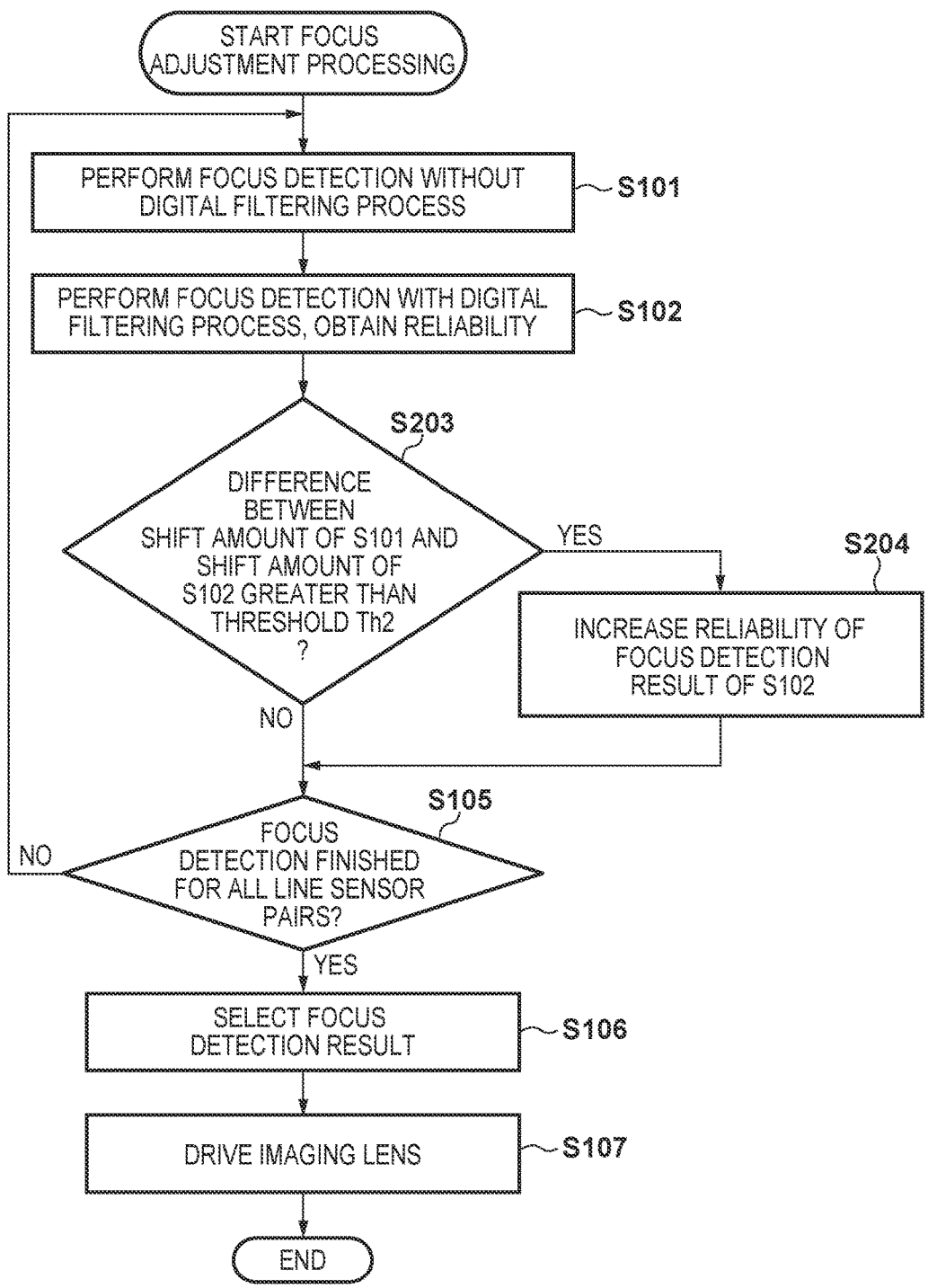
FIG. 7 is a flowchart, of focus adjustment processing according to a second embodiment.

Further, in FIG. 7, the same processes as those shown in FIG. 4 are given the same step numbers, and explanation of them are omitted. After the shift amount and reliability are obtained in steps S101 and S102, the process proceeds to step S203.

In step S203, it is determined whether or not a difference between the shift amount obtained in step S101 and the shift amount obtained in step S102 is equal to or less than a threshold Th2, and if affirmative, the process proceeds to step S204. In step S204, a process of increasing the reliability of the focus detection result that is the shift amount obtained in step S102 is carried out. As a method of increasing the reliability, an evaluation value of the reliability calculated in step S102 may be increased, for example. Alternatively, a flag indicating that the reliability is high may be introduced, and such flag is set to the focus detection result whose difference between the shift amounts is equal to or less than the threshold Th2. Note that the threshold Th2 is less than the threshold Th1 used in the first embodiment. This is because the smaller the difference between the shift amount obtained with carrying out the digital filtering process and the shift amount obtained without carrying out the digital filtering process is, the less erroneous detection occurs caused by the deformation of subject images due to inverse light transport from a finder and ghost, and such image signals are highly reliable. Accordingly, in a case where the difference between the shift amounts is equal to or less than the threshold. Th2, the reliability of the focus detection result is increased so as to increase a possibility that the focus detection result is selected.

After increasing the reliability of the focus detection result with carrying out the digital filtering process in step S204, the process proceeds to step S105.

On the other hand, in step S203, if the difference between the shift amount obtained in step S101 and the shift amount obtained in step S102 is greater than the threshold Th2, the process proceeds to step S105, and the processes explained with reference to FIG. 4 are performed in step S105 and subsequent steps.

According to the second embodiment as described above, it is possible to find out better image signals and perform focus adjustment with high precision.

The first embodiment and the second embodiment may be combined.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-154498, filed on Aug. 4, 2015 which is hereby incorporated by reference herein in its entirety.

What is claimed is:

1. A focus detection apparatus comprising:
a plurality of signal generation units that receive light transmitted through different exit pupil regions of an imaging optical system and output pairs of image signals, respectively;
a detection unit that detects first focus states of the imaging optical system by phase difference detection method based on the pairs of image signals output from the plurality of the signal generation units without carrying out a predetermined digital filtering process, and detects second focus states of the imaging optical system by the phase difference detection method based on the pairs of image signals that have undergone the predetermined digital filtering process, and reliabilities of the pairs of image signals;
a selection unit that selects a second focus state to be used for focus control of the imaging optical system from among the second focus states detected by the detection unit based on the reliabilities; and
an adjustment unit that, if a difference between the first focus state and the second focus state corresponding to the first focus state is greater than a threshold, performs a process of decreasing a possibility that the corresponding second focus state is selected by the selection unit.

2. The focus detection apparatus according to claim 1, wherein, in a case where the difference between the first focus state and the second focus state corresponding to the first focus state is greater than a first threshold, the adjustment unit lowers the reliability corresponding to the second focus state.

3. The focus detection apparatus according to claim 2, wherein the selection unit does not select the second focus state corresponding to the reliability that is lowered by the adjustment unit.

4. The focus detection apparatus according to claim 1, wherein, in a case where the difference between the first focus state and the second focus state corresponding to the first focus state is greater than a first threshold, the adjustment unit sets predetermined information indicative of the reliability being low to the result of the detection by the detection unit, and wherein the selection unit gives priority to the second focus state to which the predetermined information is not set upon selection.

5. The focus detection apparatus according to claim 4, wherein the selection unit does not select the second focus state to which the predetermined information is set.

6. The focus detection apparatus according to claim 1, wherein, in a case where the difference between the first focus state and the second focus state corresponding to the first focus state is equal to or less than a second threshold, the adjustment unit increases the reliability corresponding to the second focus state.

7. The focus detection apparatus according to claim 1, wherein at least one focus detection area is set, and at least one signal generation unit is arranged for each focus detection area.

8. The focus detection apparatus according to claim 7, wherein, in a case where a plurality of signal generation units that correspond to a selected focus detection area exist, focus control of the imaging optical system is performed based on the second focus state selected by the selection unit from among the second focus states corresponding to the signal generation units.

9. The focus detection apparatus according to claim 7, wherein, in a case where the focus detection area to be used for focus control of the imaging optical system is selected automatically, the focus control of the imaging optical system is performed based on the second focus state selected by the selection unit, and the focus detection area corresponding to the signal generation unit corresponding to the selected second focus state is displayed.

10. An image capturing apparatus comprising:
a focus detection apparatus that comprises
a plurality of signal generation units that receive light transmitted through different exit pupil regions of an imaging optical system and output pairs of image signals, respectively;
a detection unit that detects first focus states of the imaging optical system by phase difference detection method based on the pairs of image signals output from the plurality of the signal generation units without carrying out a predetermined digital filtering process, and detects second focus states of the imaging optical system by the phase difference detection method based on the pairs of image signals that have undergone the predetermined digital filtering process, and reliabilities of the pairs of image signals;
a selection unit that selects a second focus state to be used for focus control of the imaging optical system from among the second focus states detected by the detection unit based on the reliabilities; and
an adjustment unit that, if a difference between the first focus state and the second focus state corresponding to the first focus state is greater than a threshold, performs a process of decreasing a possibility that the corresponding second focus state is selected by the selection unit; and
an image sensor that receives light transmitted through the imaging optical system and outputs an image signal.

11. The image capturing apparatus according to claim 10, further comprising a focus control unit that controls driving of the imaging optical system based on the second focus state detected by the selection unit.

12. A focus detection method comprising:
detecting first focus states of an imaging optical system by phase difference detection method based on pairs of image signals output from a plurality of the signal generation units that receive light transmitted through different exit pupil regions of the imaging optical system and output the pairs of image signals, respectively, without carrying out a predetermined digital filtering process,
detecting second focus states of the imaging optical system by the phase difference detection method based on the pairs of image signals that have undergone the predetermined digital filtering process, and reliabilities of the pairs of image signals;
selecting a second focus state to be used for focus control of the imaging optical system from among the detected second focus states based on the reliabilities; and
performing, if a difference between the first focus state and the second focus state corresponding to the first focus state is greater than a threshold, a process of decreasing a possibility that the corresponding second focus state is selected as the second focus state to be used for the focus control.

* * * * *